Oct. 5, 1954          J. A. SOLTIS          2,690,787
BABY'S AUTOMOBILE SEAT
Filed Feb. 24, 1950          2 Sheets-Sheet 2
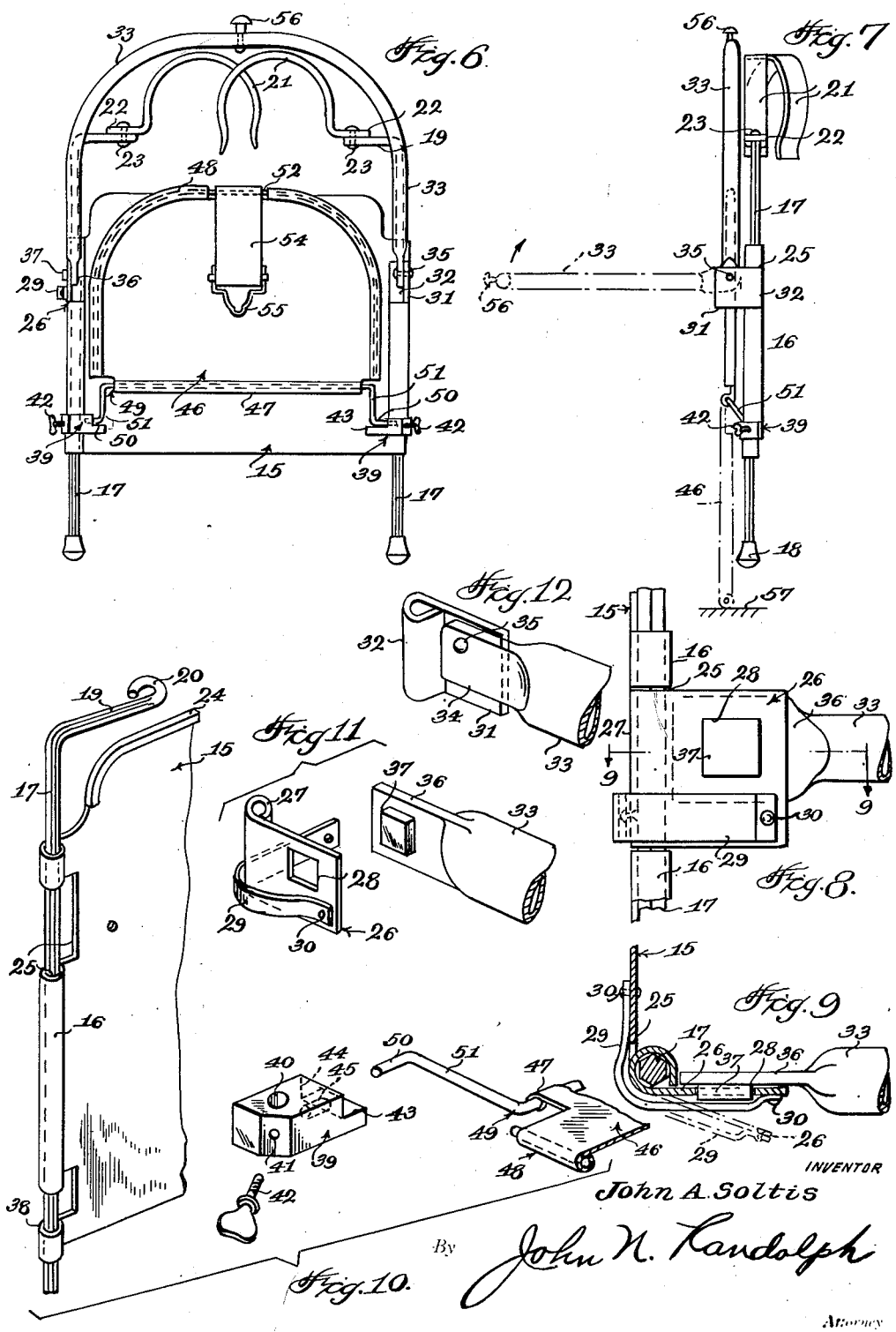
INVENTOR
John A. Soltis
By John N. Randolph
Attorney Patented Oct. 5, 1954

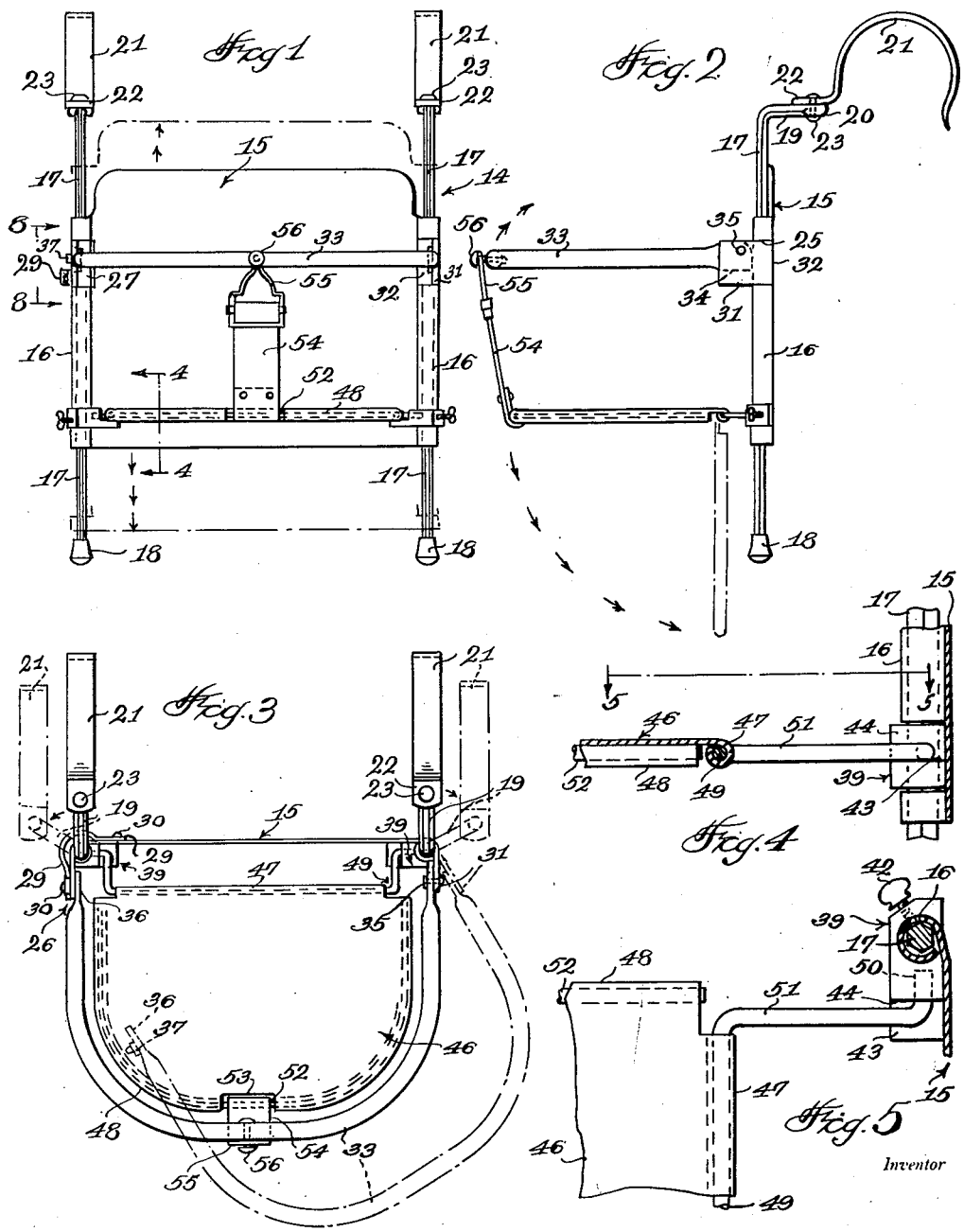

2,690,787

UNITED STATES PATENT OFFICE 2,690,787

BABY'S AUTOMOBILE SEAT

John A. Soltis, Reading, Pa., assignor to Dennis Berlin and Irving Berlin, trading as Dennis Mitchell Industries, Philadelphia, Pa.

Application February 24, 1950, Serial No. 145,931

11 Claims. (Cl. 155—11)

This invention relates to a novel construction of automobile seat for babies and young children and constitutes an improvement over my prior co-pending application entitled Baby's Automobile Seat, filed July 2, 1948, and bearing Serial No. 36,772, now Patent No. 2,553,527, issued December 12, 1950.

Among the primary objects of the present invention, in addition to the objects pointed out in my prior application herein referred to, is to provide a seat of simplified construction which may be folded into a compact form, when not in use for storage or which may be disposed in a folded position while supported in an applied position on the back rest of an automobile seat.

Another important object of the present invention is to provide a baby's seat which is adjustable for properly fitting very young children or older children and which provides a full length seat for either a baby or an older child.

Another object of the invention is to provide an automobile seat wherein the seat portion and guard rest as a unit are adjustable upwardly and downwardly with respect to an automobile seat for accommodating children of different sizes and so that the feet of even a very young child may rest on the vehicle seat, yet which seat may be swung downwardly to assume an upright position, substantially parallel to the back rest, even when the seat is in a lowered position.

Still another object of the invention is to provide a guard rail which is swingably mounted for vertical swinging movement between positions substantially parallel to the frame of the automobile seat and at substantially a right angle thereto, and which is provided with a simplified form of latch means for releasably latching said guard rail in either of its positions or for disengaging one end of the guard rail to permit the guard rail to swing to an open position in a plane substantially at a right angle to the plane of the frame of the seat structure to enable a child to enter or leave the baby's seat without being lifted over a guard rail thereof.

Still a further and important object of the present invention is to provide a baby's seat having adjustable back rest engaging supporting means to enable the baby's seat to be readily mounted on the upper edge of back rests of different makes of automobiles which vary considerably in height and curvature.

Various other objects and advantages of the invention will hereinafter become more fully apparent from the following description of the drawings, illustrating a presently preferred embodiment thereof, and wherein:

Figure 1 is a front elevational view showing the baby's automobile seat in an extended, operative position;

Figure 2 is a side elevational view, looking from right to left of Figure 1 and showing the seat proper swung downwardly in dotted lines and in one position which it may assume when the guard rail only is utilized to protect a standing child;

Figure 3 is a top plan view of the baby's seat as illustrated in Figure 1 and illustrating adjustment of the parts in dotted lines;

Figure 4 is an enlarged fragmentary vertical sectional view taken substantially along a plane as indicated by the line 4—4 of Figure 1;

Figure 5 is a horizontal sectional view thereof taken substantially along a plane as indicated by the line 5—5 of Figure 4;

Figure 6 is a front elevational view showing the baby's automobile seat in a fully folded or collapsed position for storage;

Figure 7 is an edge elevational view looking from right to left of Figure 6 and illustrating in dotted lines alternate positions of certain of the parts;

Figure 8 is an enlarged edge elevational view of a portion of the vehicle seat taken substantially along a plane as indicated by the line 8—8 of Figure 1;

Figure 9 is a horizontal sectional view thereof taken substantially along a plane as indicated by the line 9—9 of Figure 8;

Figure 10 is an exploded perspective view of certain of the parts of the invention;

Figure 11 is a similar view of other parts thereof, and

Figure 12 is a fragmentary perspective view of still other portions of the invention.

Referring more specifically to the drawings, the improved baby's automobile seat in its entirety is designated generally 14 and includes a back rest, designated generally 15 which is preferably formed of sheet metal and which has rolled side edge portions forming tubes or sleeves 16 which are disposed substantially parallel and each of which is adapted to slidably and turnably receive a supporting rod 17. As best illustrated in Figure 9, the rods 17 are each preferably hexagon shaped in cross section, for a purpose which will hereinafter become apparent. Each rod 17 preferably has a rubber cap or tip member 18 suitably secured on its lower end. The upper end of each rod 17, as best illustrated in Figures 2 and 10 terminates in a right angular arm 19 having a loop or eye 20 at the terminal thereof. Each arm 19 is swingably connected to a downwardly opening back rest engaging hook 21 having a short shank portion 22 at one end thereof which is disposed in the same plane as the open bottom of the hook 21 and which is mounted on and swivelly connected to one of the eyes 20 by a rivet or similar fastening 23 so that the hooks 21 may be swung to extended positions as illustrated in Figures 1, 2 and 3 or to folded positions, as illustrated in Figures 6 and 7. The supporting rods 17 combine with the hooks 21 and back rest 15 to form the supporting frame structure of the baby's automobile seat 14.

The back rest 15 is provided with a rolled upper edge 24 which extends to substantially above the upper end of its tubes or sleeves 16. Each tube or sleeve 16, near its upper end, is provided with a cut out portion 25 which extends into the back rest 15, as best seen in Figure 10 to receive a barrel portion of a guard rail supporting member. Two of such guard rail supporting members are provided, one of which, designated generally 26 and best illustrated in Figure 11, has one end rolled to provide a barrel portion 27 which fits into the cut out 25 at the left side of the back rest 15, looking toward the front of the back rest, or as seen in Figures 1 and 6. The barrel portion 27 loosely engages a rod 17 which is journaled in said left-hand sleeve 16 for swinging movement relatively thereto and said supporting member 26 is provided with a square opening 28. A curved leaf spring 29 is secured at one end by a fastening 30 to the free end and outer side of the supporting member 26, below the opening 28, and extends along the outer side of the member 26 around its barrel portion 27 and is secured at its opposite end by additional fastening 30 to the back side of the back rest 15, as best seen in Figure 3. As best seen in Figure 12, a supporting member 31 of a shape and size corresponding to the supporting member 26 is provided with a barrel portion 32 at one end thereof which fits into the right-hand cut out portion 25 and turnably engages the other rod 17. The opening 28 and spring 29 are omitted from the guard rail supporting member 31. A substantially U-shaped guard rail 33, which is preferably of circular cross section, is provided with flattened ends one of which, designated 34 is connected by a single rivet or other fastening 35 to the supporting member 31 so that the guard rail 33 may swing on the fastening 35 in a plane substantially at a right angle to the plane of the back rest 15 from an upright position, as illustrated in full lines in Figure 7 to a horizontal position, as illustrated in Figure 2. As seen in Figure 11, the guard rail 33 has an opposite flattened end 36 which is provided with a square projection 37 on its outer side sized to fit snugly in the opening 28. The spring 29 normally urges the supporting member 26 to swing inwardly on its supporting rod 17 to retain the opening 28 in engagement with the projection 37. However, the outer, bottom edge of the supporting member 26 may be engaged with the finger and swung outwardly against the action of the spring 29 to disengage the opening 28 from the projection 37 so that the guard rail 33 may be swung on its pivot 35 between its full line and dotted line positions of Figure 7 and as such positions are at right angles to one another, the projection 37 will engage the opening 28 in either of said positions to latch the guard rail 33 in its folded, full line position of Figure 7, substantially parallel to the rods 17 or in its extended, horizontal position of Figure 2 substantially at a right angle to the axes of the rods 17. Likewise, by disengaging the projection 37 from the plate 26, the guard rail 33 while in its last mentioned, horizontal position may be swung on the right hand rod 17 as an axis from its closed, full line position of Figure 3 in a counterclockwise direction to and beyond its dotted line position of Figure 3 and which constitutes an open position of the guard rail, hereinafter to be described more in detail. This swinging movement of the guard rail 33 is accomplished by the supporting member 31 swinging therewith and with its barrel portion 32 turning on the right-hand supporting rod 17 which it engages.

The two portions 16 are each provided with a second cut out portion 38 adjacent its lower end to receive an end of a block, designated generally 39. The two blocks 39 are each provided with a bore 40 extending therethrough from top to bottom thereof and in the end of the block which is accommodated in the cut out 38. The bores 40 loosely engage the supporting rods 17. Said blocks 39 are also provided each with a threaded bore 41 which extends between a side wall of the block and the bore 40 for receiving a setscrew 42 which is adapted to be turned with the fingers and advanced into the bore 40 and into engagement with the rod 17 engaged thereby for detachably securing the block 39 to said rod 17 and, since the blocks 39 fit relatively snug in the cut outs 38, for holding the rods 17 against sliding movement relatively to the tube portions 16. The blocks 39 normally extend from the rods 17 toward one another along the inner or front side of the back rest 15 and the inner or free ends of said blocks are each recessed in its upper portion to form an upwardly facing shoulder 43 and an upright wall 44 which rises from the inner edge of the shoulder 43. Each block 39 has a longitudinally extending recess 45 which opens outwardly of the wall 44 above and adjacent the shoulder 43.

A seat, designated generally 46, which is likewise preferably formed of sheet metal has a rolled straight edge forming a tube portion 47 and a rolled substantially U-shaped edge forming a tube portion 48. The ends of the tube portion 48 terminate adjacent to but spaced from the ends of the tube portion 47. A rod member 49 has a straight intermediate portion which is journaled in the tube portion 47 and is provided with corresponding laterally offset terminals 50 which are offset from its intermediate portion by lever portions 51 which are disposed substantially at right angles to said intermediate portion and to the offset terminals 50 and which are disposed beyond but adjacent the ends of the tube portion 47. An elongated reinforcing element 52 extends through the tubular portion 48 from end-to-end thereof. The arms 51 are sprung toward one another sufficiently so that the offset terminals 50 may be engaged in the recesses 45 of the two blocks 39. Said terminals 50 are journaled in the recesses 45 and portions of the arms 51 are disposed over the upwardly facing shoulders 43 which thus form stops to prevent the arms 51 from swinging downwardly below a substantially horizontal position or a position at a right angle to the rods 17, as illustrated in Figures 2 and 4.

The tubular portion 48 has a cut out part 53 intermediate of its ends to expose a part of the reinforcing member 52, which part is engaged by a strap 54 which is anchored at one end thereof to the reinforcing member 52 and thus connected to the outer, free edge of the seat 46. The supporting strap 54 has a stud engaging loop member 55 secured to and projecting from its free end and which is adapted to detachably engage the restricted shank of a headed stud 56 which projects outwardly from the intermediate portion of the guard rail 33 whereby the forward, free end of the seat 46 may be supported through the strap 54 by the guard rail 33.

It will be readily apparent that the back rest 15 may be adjusted vertically of the supporting rods 17, assuming that the setscrews 42 are loosened, for positioning said back rest adjacent the lower ends of the rods 17 for accommodating a baby or relatively young child, or adjacent the upper ends of the rods 17 for accommodating an older, larger child. It will likewise be readily apparent that the guard rail supporting members 26 and 31 will slide on the rods 17 with the back rest 15 and that the blocks 39 will likewise slide with the back rest 15 relatively to the rods 17, so that the guard rail 33 and seat 46 will be adjusted vertically relatively to the rods 17 as a unit with the back rest 15. Assuming that the back rest, seat and guard rail are adjusted to a relatively low position with respect to the rods 17 and that the hooks 21 are engaging the upper edge of the back rest of the vehicle seat for supporting the baby's automobile seat 14 on the front side of such back rest, not shown, the arm portions 51 may be swung downwardly to their positions of Figures 2 and 4 for positioning the seat 46 in a lowermost position, as illustrated in Figure 2 and in sufficiently close proximity to the vehicle seat, a portion of which is indicated at 57 in Figure 7, so that a child seated on the seat portion 46 may rest its feet on the vehicle seat 57. It will be readily apparent that the outer, front end of the seat 46 will be supported by the strap 54 through its engagement with the guard rail 33. However, the baby's seat 14 is likewise adapted to be used to accommodate a standing child and with the guard rail 33 protecting the child from falling or from walking along or off of the seat. In order to accomplish this and to provide a full length seat as illustrated at 46, the arms 51 are provided since, due to the length of the seat 46 from its rear to its front edge, when the seat 46 is swung downwardly as illustrated in dotted lines in Figure 2 and is disposed in a lowered position for a small child, the seat 46 will strike the vehicle seat 57 before it can assume a depending position and accordingly will not afford sufficient space for a child to stand on the vehicle seat 57 while confined by the guard rail 33. However, the arms 51 which are preferably at least one and one-half inches in length may be swung upwardly as illustrated in Figure 7 so that the seat 46 will thus be elevated relatively to the back rest 15 and guard rail 33 to enable it to assume a depending, vertical position, as illustrated in dotted lines in Figure 7 and with its forward, free end resting on the seat 57 to thereby not interfere with a child standing on the seat 57.

A child may also be placed in the baby's seat 14 or removed therefrom without being lifted over the guard rail 33 since, with the seat 46 in a depending position, as illustrated in Figures 2 and 7, the guard rail supporting member 26 may be engaged by the thumb at its outer bottom corner and swung outwardly against the action of the spring 29 to disengage its opening 28 from the projection 37 so that the guard rail 33 may be swung in a horizontal plane, as previously described and as illustrated in Figure 3 to allow a child to walk into or out of the baby's automobile seat 14, without being lifted over the guard rail, after which the guard rail is returned to its latched, full line position of Figure 3. This latch means is disposed at what constitutes the curb side of the baby's automobile seat 14.

When the seat is not in use it may be compactly folded for storage as illustrated in Figure 6 by unhooking the seat 46 from the guard rail 33 then swinging the seat 46 upwardly against the inner or front side of the back rest 15. The projection 37 may then be disengaged from the opening 28, as previously described and the guard rail 33 swung upwardly on its pivot 35 to a position parallel to the rod 17. The projection 37 is then reengaged with the opening 28 for latching the guard rail 33 in its upright position, as seen in Figures 6 and 7. With the fastenings 42 loosened, the supporting rods 17 may be turned in the barrel portions 16 and relatively to the barrel portions 27 and 32 and the blocks 39 so that the arms 19 will extend toward one another and the hooks 21 may then be disposed in overlapping relationship, as seen in Figures 6 and 7 to thus afford a compact unit for storage.

In modern automobiles, the height and contour of the back rests vary considerably so that the rods 17 must be adjusted longitudinally of the back rest 15 to accommodate the baby's seat 14 to back rests of different heights. Furthermore the bulge or contour of the front side of back rests of different cars vary and to enable the supporting rods 17 to be disposed against the front side of the back rest of any car, the arm portions 19 and the swivel mounting of the hooks 21 is provided so that said arms may extend directly away from the back rest 15 and in parallel relationship to one another for offsetting the hooks 21 from the rods 17 to mount the seat 14 on back rests having bulged front sides, or the arms 19 may be disposed in alignment with one another or may project rearwardly at oblique angles to the plane of the back rest 15 for vehicle seat back rests of less thickness or which are not bulged on their front sides. Likewise, with the hooks 21 engaging over the upper edge of a back rest, the guard rail 33 may be latched in an upright position as seen in Figures 6 and 7 and the seat 46 may be disposed in a vertical depending position, as seen in dotted lines in Figures 2 and 7 so that the baby's seat 14 may be conveniently carried when not in use on the back rest of a motor vehicle yet will be folded in a compact manner so as not to afford an obstruction or cause inconvenience to the driver or passengers.

The back rest 15 and seat 46 are provided with suitable cushions, not shown, on their inner and upper sides, respectively.

Various modifications and changes are contemplated and may obviously be resorted to, without departing from the spirit or scope of the invention as hereinafter defined by the appended claims.

I claim as my invention:

1. A baby's automobile seat comprising a frame adapted to be disposed against the forward side of the back rest of an automobile seat including a back rest, a pair of supporting rods slidably engaging the back rest and a hook member connected to the upper end of each rod and adapted to detachably engage over the upper edge of the vehicle seat back rest for supporting the frame thereon, said supporting rods being disposed parallel and adjustable vertically of the baby's seat back rest for positioning the baby's seat back rest at different levels relatively to the hook members; a guard rail supporting member swingably and slidably mounted on each of said supporting rods and engaging the baby's seat back rest and supported thereby and movable therewith relatively to said supporting rods, a substantially U-shaped guard rail having one end pivotally connected to one of said guard rail supporting members, latch means detachably connecting the other end of said guard rail to the other guard rail supporting member and positioning the guard rail either in a plane substantially parallel to the plane of said supporting rods or in a plane at substantially a right angle to said supporting rods, a seat member, means for pivotally and swingably connecting an inner, rear edge of the seat member to the frame below the guard rail for swinging movement of said inner edge of the seat member from a raised position against the baby's seat back rest outwardly and downwardly through an arc of approximately 90°, and a flexible supporting member connected at one end to the intermediate portion of the front, free end of said seat member and detachably connected at its opposite end to the intermediate portion of the guard rail to support the seat member at approximately a right angle to the plane of said supporting rods.

2. A baby's automobile seat as in claim 1, said means for pivotally and swingably connecting the seat member to the frame comprising a rod having an intermediate portion journaled in and extending across the inner end portion of the seat member and having laterally offset terminal portions and arm portions connecting the ends of the intermediate portion to said terminal portions, blocks slidably and turnably connected to said supporting rods and engaging the back rest and supported by the baby's seat back rest for movement therewith, said blocks having recesses in which said offset terminals are journaled and upwardly facing shoulders disposed beneath and engaged by the arm portions of said rod when said arm portions are disposed at substantially a right angle to the plane of the frame.

3. A baby's automobile seat as in claim 1, said supporting rods having angularly disposed upper end portions, and said back rest engaging hooks being swively connected to said angularly disposed portions of the supporting rods with the axes of the swivels offset relatively to the axes of the supporting rods.

4. A baby's automobile seat as in claim 1, said means for pivotally and swingably connecting the seat member to the frame comprising a rod having an intermediate portion journaled in and extending across the inner end portion of the seat member and having laterally offset terminal portions and arm portions connecting the ends of the intermediate portion to said terminal portions, blocks slidably and turnably connected to said supporting rods and engaging the back rest and supported by the baby's seat back rest for movement therewith, said blocks having recesses in which said offset terminals are journaled and upwardly facing shoulders disposed beneath and engaged by the arm portions of said rod when said arm portions are disposed at substantially a right angle to the plane of the frame, said back rest being formed of sheet metal and having tubular side edge portions for turnably and reciprocally receiving the supporting rods, each of said tubular side edge portions having an upper cut out portion for receiving a barrel portion of one of the guard rail supporting members through which the supporting rod of said tubular portion loosely extends and a lower cut out portion for accommodating a portion of one of the blocks through which said supporting rod loosely extends.

5. A baby's automobile seat as in claim 1, said supporting rods having angularly disposed upper end portions, and said back rest engaging hooks being swively connected to said angularly disposed portions of the supporting rods with the axes of the swivels offset relatively to the axes of the supporting rods, said supporting rods being of non-circular cross section, and fastening means for adjustably securing the supporting rods to the back rest for positioning the entire seat at different distances from the ends of the supporting rods and for positioning the angular extensions of the supporting rods at different angles relatively to the plane of the frame.

6. A baby's automobile seat comprising a frame including a back rest, a pair of rods slidably and rotatably connected to said back rest and disposed parallel to one another and a pair of hook members connected one to each of said supporting rods at the upper ends thereof and adapted to detachably engage over the upper edge of an automobile seat back rest for supporting the frame on the front side thereof, said back rest being displaceable longitudinally of the supporting rods to position it at different levels with respect to said hook members, a substantially U-shaped guard rail mounted on said supporting rods and connected to the back rest for movement therewith, means for swingably mounting one end of the guard rail for movement in a vertical plane between an upright position substantially parallel to the plane of the frame downwardly to a horizontal position at a right angle to the plane of the frame or for swinging movement in a horizontal plane for displacing the opposite end of the guard rail toward or away from the frame, latch means for detachably connecting said last mentioned end of the guard rail to the frame in either its upright or horizontal position and for maintaining the guard rail in either of said positions, a seat member, means for pivotally and swingably connecting the seat member to the frame at the inner, back edge of the seat member, said means being engageable by the baby's seat back rest for movement in unison therewith and with the guard rail relatively to said supporting rods, and a supporting member connected at one end to the outer front edge of the seat member and detachably connected at its opposite end to the intermediate portion of the guard rail for suspending the seat member beneath the guard rail.

7. In a baby's automobile seat, a supporting frame including a back rest and a pair of supporting rods slidably and turnably connected to the back rest and disposed substantially parallel, said supporting rods having downwardly opening back rest engaging hook members at their upper ends, means swively connecting each of said hook members to one of the supporting rods, means offsetting the swivels of said hook members from the axes of the supporting rods, said last mentioned means being longitudinally and angularly adjustable relatively to the back rest of the supporting frame by reciprocating and turning movement of the supporting rods relatively to said back rest, and manually operated means for detachably clamping the back rest to the supporting rods.

8. In a baby's automobile seat including a supporting frame adapted to be suspended on an automobile back rest and disposed on the front side thereof and including a guard rail supported by the frame in an operative position at substantially a right angle to the plane of the frame, a seat member, a rod having end portions journaled in a part of said frame and an intermediate portion offset relatively to the axis of said end portions, said intermediate portion of the rod being journaled in one end of the seat member for swingably mounting the seat member for swinging movement about two axes relatively to the frame, and means for detachably supporting the other, free end of the seat member on the intermediate portion of the guard rail.

9. A baby's automobile seat as in claim 8, and stop means for engaging portions of said seat member engaging rod for limiting the downward swinging movement of the inner end of the seat member.

10. A device for supporting a child in a sitting position above the seat cushion of a vehicle seat structure or for confining the movements of the child, while directly supported by said cushion, to a limited area thereof: said device comprising the combination, with an auxiliary chair, of a U-shaped guard bar, means connecting said bar to said chair, a strap, and means for suspending said auxiliary chair from the back rest portion of said seat structure; said chair comprising a back rest element, a seat element, and pivot means connecting the adjacent ends of said elements together for selectively forming one arrangement in which the two elements extend in the same direction and substantially in parallelism from said pivot means or a second arrangement in which the seat element extends from the pivot means in a direction substantially perpendicular to the back rest element or a third arrangement in which the two elements extend in opposite directions from the pivot means, and a latch device pivotally mounted on one of the opposite sides of the back rest element and resiliently urged to swing toward the center thereof, the first mentioned means pivotally connecting said guard bar to the back rest at the other opposite side thereof for permitting swinging movement about one axis to bring the free end of said guard bar into engagement with said latch device or out of position for such engagement and for permitting swinging movement of the guard bar about a second axis from one position parallel to the back rest element to a second position perpendicular thereto, said latch device and said end engageable therewith having cooperative formations thereon for releasably holding said guard bar in either of said positions; said strap being connected at one end thereof to the seat element to extend from the front edge thereof and the free end of the strap and an intermediate portion of the guard bar having cooperative means for detachably connecting said free end to the guard bar for supporting the front end of the seat element in said second arrangement of the chair parts; and said suspending means comprising a pair of hooks pivotally connected to the opposite sides of the back rest element and extending therefrom and each including a bight portion for engagement with the top of the back rest portion of the seat structure and terminating in a free end, said hooks being swingable about their pivots to permit their bight portions to lie in substantially parallel planes or their free ends to occupy positions adjacent to each other.

11. A device for supporting a child in a sitting position above the seat cushion of a vehicle seat structure or for confining the movements of the child, while directly supported by the seat cushion, to a limited area thereof: said device comprising the combination, with an auxiliary chair, of a U-shaped guard bar, means connecting the bar to the chair, a strap, and means for suspending said auxiliary chair from the back rest portion of said seat structure; said chair comprising a back rest element, a seat element, and pivot means connecting the adjacent ends of the two elements together for selectively forming one arrangement in which the two elements extend in the same direction and substantially in parallelism from the pivot means or a second arrangement in which the seat element extends from the pivot means in a direction substantially perpendicular to the back rest element or a third arrangement in which the two elements extend in opposite directions from the pivot means; the first mentioned means comprising a pair of structures arranged at the opposite sides of the back rest element, one of them being formed to permit a limited swinging movement of the guard bar from a position in parallelism with the back rest element to a second position perpendicular thereto; said strap being secured at one end thereof to the seat element to extend from the front edge thereof and the free end of the strap and an intermediate portion of the guard bar having cooperative means for detachably connecting said free end to the guard bar for supporting the front end of the seat element in said second arrangement of the chair parts; and said suspending means comprising a pair of hooks pivotally connected to the opposite sides of the back rest element and extending therefrom and each including a bight portion for engagement with the top of the back rest portion of the seat structure and terminating in a free end, said hooks being swingable about their pivots to permit their bight portions to lie in substantially parallel planes or their free ends to occupy positions adjacent to each other.

References Cited in the file of this patent

UNITED STATES PATENTS

| Number | Name | Date |
|---|---|---|
| 781,090 | Perkins | Jan. 31, 1905 |
| 1,546,768 | West | July 21, 1925 |
| 1,688,225 | Belalohlavek | Oct. 16, 1928 |
| 1,760,008 | Schermerhorn | May 27, 1930 |
| 2,349,092 | Hammer | May 16, 1944 |
| 2,481,382 | Bennett | Sept. 6, 1949 |
| 2,494,581 | Prigg | Jan. 17, 1950 |
| 2,533,527 | Soltis | Dec. 12, 1950 |